United States Patent
Freese et al.

(10) Patent No.: US 11,238,113 B2
(45) Date of Patent: Feb. 1, 2022

(54) SYSTEMS AND METHODS FOR MACHINE LEARNING MODELS FOR SEARCH ENGINE PERFORMANCE OPTIMIZATION

(71) Applicant: Grand Rounds, Inc., San Francisco, CA (US)

(72) Inventors: Nathaniel Freese, San Francisco, CA (US); Derek Macklin, San Francisco, CA (US); Ramkrishna Soma, San Francisco, CA (US); Eric Carlson, San Francisco, CA (US); Steven Martin, San Francisco, CA (US)

(73) Assignee: Grand Rounds Inc., San Francisco, CA (US)

( * ) Notice: Subject to any disclaimer, the term of this patent is extended or adjusted under 35 U.S.C. 154(b) by 0 days.

(21) Appl. No.: 17/216,511

(22) Filed: Mar. 29, 2021

(65) Prior Publication Data

US 2021/0311999 A1    Oct. 7, 2021

Related U.S. Application Data

(60) Provisional application No. 63/003,776, filed on Apr. 1, 2020.

(51) Int. Cl.
| | | |
|---|---|---|
| *G06F 16/9532* | (2019.01) | |
| *G06F 16/9537* | (2019.01) | |
| *G06N 20/00* | (2019.01) | |
| *G06F 16/9032* | (2019.01) | |
| *G06F 16/9538* | (2019.01) | |

(52) U.S. Cl.
CPC .... *G06F 16/9532* (2019.01); *G06F 16/90324* (2019.01); *G06F 16/9537* (2019.01); *G06F 16/9538* (2019.01); *G06N 20/00* (2019.01)

(58) Field of Classification Search
CPC ............ G06F 16/9532; G06F 16/9537; G06F 16/90324; G06F 16/9538; G06N 20/00
USPC ........................................................ 707/706
See application file for complete search history.

(56) References Cited

U.S. PATENT DOCUMENTS

| | | | | |
|---|---|---|---|---|
| 7,617,164 B2 * | 11/2009 | Burges | ................. | G06N 20/00 706/15 |
| 7,813,822 B1 * | 10/2010 | Hoffberg | .......... | H04N 21/44222 700/94 |
| 9,269,057 B1 * | 2/2016 | Chandra | ................ | G06N 20/00 |
| 9,552,549 B1 * | 1/2017 | Gong | ................... | G06N 3/0454 |
| 10,262,039 B1 * | 4/2019 | Ramanathan | ....... | G06F 16/9536 |

(Continued)

*Primary Examiner* — Mark E Hershley
(74) *Attorney, Agent, or Firm* — Finnegan, Henderson, Farabow, Garrett & Dunner, LLP

(57) ABSTRACT

Methods, systems, and computer-readable media for updating a machine learning model utilized in a search engine operation. The method identifies a set of search queries in stored search queries corresponding to a service and apply the identified set of search queries to the search engine to generate one or more search results for the service. Each search result has an assigned aggregate based on values of a set of parameters associated with the service. The method then analyzes the values of the set of parameters to determine a tradeoff point of each parameter to determine one or more weights to apply to the machine learning model based on the tradeoff points. The method stores the determined one or more weights and applies them to the machine learning model for a search query corresponding to the service.

20 Claims, 9 Drawing Sheets

(56) References Cited

U.S. PATENT DOCUMENTS

| | | | |
|---|---|---|---|
| 10,657,556 B1* | 5/2020 | Lu | G06N 20/00 |
| 2010/0153324 A1* | 6/2010 | Downs | G06F 40/258 |
| | | | 706/21 |
| 2010/0306249 A1* | 12/2010 | Hill | G06Q 50/01 |
| | | | 707/769 |
| 2014/0075004 A1* | 3/2014 | Van Dusen | H04L 41/04 |
| | | | 709/223 |
| 2015/0278912 A1* | 10/2015 | Melcher | H04W 4/80 |
| | | | 705/26.7 |
| 2016/0055160 A1* | 2/2016 | Himel | G06F 16/248 |
| | | | 707/728 |
| 2017/0011029 A1* | 1/2017 | Chatterjee | G06N 5/025 |
| 2017/0053186 A1* | 2/2017 | Allen | G06K 9/00302 |
| 2017/0076223 A1* | 3/2017 | Kozhaya | G06N 20/00 |
| 2017/0140262 A1* | 5/2017 | Wilson | G06Q 30/0282 |
| 2017/0193390 A1* | 7/2017 | Weston | G06N 3/08 |
| 2017/0220652 A1* | 8/2017 | Kazi | G06Q 50/01 |
| 2017/0220677 A1* | 8/2017 | Kazi | G06F 16/3344 |
| 2017/0322939 A1* | 11/2017 | Byron | G06N 20/00 |
| 2017/0372056 A1* | 12/2017 | Narasimhan | H04L 63/0861 |
| 2018/0039675 A1* | 2/2018 | Gu | G06F 16/2455 |
| 2020/0057762 A1* | 2/2020 | Okajima | G06F 40/40 |
| 2020/0104288 A1* | 4/2020 | Tao | G06N 20/00 |
| 2020/0104746 A1* | 4/2020 | Strope | G06N 20/00 |
| 2020/0152179 A1* | 5/2020 | van Hout | G06N 3/04 |
| 2020/0320153 A1* | 10/2020 | Luz Xavier Da Costa | |
| | | | G06K 9/6256 |
| 2021/0065259 A1* | 3/2021 | Luong | G06Q 30/0282 |

* cited by examiner

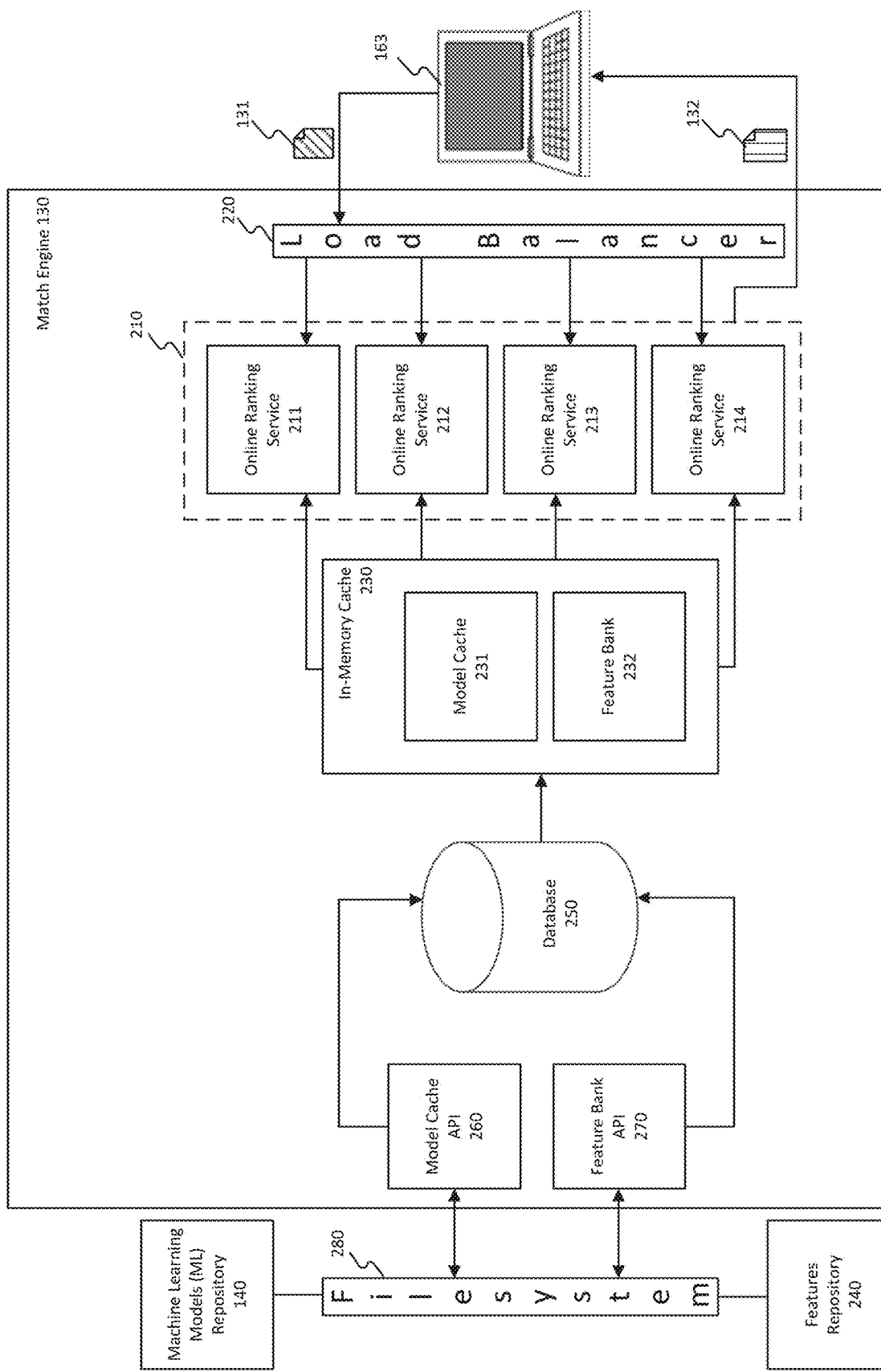

| Field | Description |
|---|---|
| Service Provider | The provider's NPI |
| Location | The zip code in which the search was executed |
| Aggregate Rank | Rank of provider in this search |
| Search Term | Concept ID of search term |

Fig. 3A

| Field | Description |
|---|---|
| Location | The zip code in which a search was executed |
| Customer | Customer with members in the zip code |
| User Count | Number of customer's members in the zip code |

Fig. 3B

| Field | Description |
|---|---|
| Search Term | Concept ID of search term |
| Search Volume | Raw search volume for this concept |

Fig. 3C

| Field | Description |
|---|---|
| Rank | Rank in search results |
| Discount | Relative likelihood of conversion as a function of rank |

Fig. 3D

SYSTEMS AND METHODS FOR MACHINE LEARNING MODELS FOR SEARCH ENGINE PERFORMANCE OPTIMIZATION

CROSS-REFERENCE TO RELATED APPLICATIONS

This application claims priority to U.S. Provisional Application No. 63/003,776, filed on Apr. 1, 2020, the entirety of which is hereby incorporated by reference.

BACKGROUND

An ever increasing amount of data and data sources are now available to researchers, analysts, organizational entities, and others. This influx of information allows for sophisticated analysis but, at the same time, presents many new challenges for sifting through the available data and data sources to locate the most relevant and useful information. As the use of technology continues to increase, so, too, will the availability of new data sources and information.

Because of the abundant availability of data from a vast number of data sources, determining the optimal values and sources for use presents a complicated problem difficult to overcome. Accurately utilizing the available data can require both a team of individuals possessing extensive domain expertise as well as many months of work to evaluate the outcomes. The process can involve exhaustively searching existing literature, publications, and other available data to identify and study relevant data sources that are available both privately and publicly.

While this approach can often provide effective academic analysis, applying these types of analytical techniques to domains requiring accurate results obtainable only through time and resource intensive research is incompatible with modern applications' demands. For example, the developed process for evaluating outcomes may not line up with specific circumstances or individual considerations. In this scenario, applying the process requires extrapolation to fit the specific circumstances, dilute the process's effectiveness, or require spending valuable time and resources to modify the process. As a result, processes developed in this way typically provide only generalized guidance insufficient for repurposing in other settings or by other users. As more detailed and individualized data becomes available, demand for the ability to accurately discern relevant data points from the sea of available information, and efficiently apply that data across thousands of personalized scenarios increases.

SUMMARY

Certain embodiments of the present disclosure relate to a non-transitory computer readable medium, including instructions that when executed by one or more processors cause a system to perform a method for updating a machine learning model utilized in a search engine operation. The method may include identifying a set of search queries in stored search queries, wherein the set of search queries correspond to a service, applying the identified set of search queries to the search engine to generate one or more search results for the service, wherein each search result has an assigned aggregate based on values of a set of parameters associated with the service, analyzing the values of the set of parameters to determine a tradeoff point of each parameter, wherein the tradeoff point of a parameter occurs when updating the value of the parameter negatively impacts other parameters in the set of parameters, determining one or more weights to apply to the machine learning model based on the tradeoff points of the set of parameters, storing the determined one or more weights, wherein the stored weights are associated with the service corresponding to the identified set of stored search queries, and applying the determined one or more weights to the machine learning model for a search query corresponding to the service.

According to some disclosed embodiments, identifying the set of search queries may comprise determining locations where amount of the stored search queries originated is greater than a threshold amount, identifying search queries originating in the determined locations, and filtering identified search queries not associated with the service.

According to some disclosed embodiments, identifying the set of search queries may further comprise identifying the set of search queries based on top services that are searched on the search engine.

According to some disclosed embodiments, identifying the set of stored search queries corresponds to a plurality of services.

According to some disclosed embodiments, the method may further include determining sequentially one or more weights to apply to the machine learning model for each service of the plurality of services.

According to some disclosed embodiments, the method may further include aggregating weights of the machine learning model for all services.

According to some disclosed embodiments, the machine learning model being updated was not part of the search engine when the identified set of search queries were previously applied to the search engine.

According to some disclosed embodiments, updating the value of a parameter negatively impacts other parameters by decreasing in value of one or more of the other parameters.

According to some disclosed embodiments, wherein the assigned aggregate based on the set of parameters at least include: quality score of a service provider offering the service or convenience score of the service provider offering the service.

According to some disclosed embodiments, the negative impact on the quality score of a service provider occurs with a decrease of the quality score of the service provider.

According to some disclosed embodiments, the convenience score of the service provider is based on travel distance between the location of the service provider delivering the service and location where the search query originated.

According to some disclosed embodiments, the negative impact on the convenience score of the service provider parameter occurs with increase in the travel distance.

Certain embodiments of the present disclosure relate to a method performed by a system for updating a machine learning model utilized in a search engine operation. The method may include identifying a set of search queries in stored search queries, wherein the set of search queries correspond to a service, applying the identified set of search queries to the search engine to generate one or more search results, wherein each search result has an assigned aggregate based on values of a set of parameters associated with the service, analyzing the values of the set of parameters to determine tradeoff point of each parameter, wherein the tradeoff point of a parameter occurs when updating the value of the parameter negatively impacts other parameters in the set of parameters, determining one or more weights to apply to the machine learning model based on the tradeoff points of the set of parameters, storing the determined one or more weights, wherein the stored weights are associated with the service corresponding to the identified set of stored search queries, and applying the determined one or more weights to the machine learning model for a search query corresponding to the service.

According to some disclosed embodiments, identifying the set of search queries may further comprise determining locations where amount of the stored search queries originated is greater than a threshold amount, identifying search queries originating in the determined locations, and filtering identified search queries not associated with the service.

According to some disclosed embodiments, identifying a set of search queries may further comprise identifying the set of search queries based on top services that are searched on the search engine.

According to some disclosed embodiments, identifying a set of stored search queries corresponds to a plurality of services.

According to some disclosed embodiments, the method may further include determining sequentially one or more weights to apply to the machine learning model for each service of the plurality of services, and aggregating weights of the machine learning model for all services.

According to some disclosed embodiments, the machine learning model being updated was not part of the search engine when the identified set of search queries were previously applied to the search engine.

According to some disclosed embodiments, updating the value of a parameter negatively impacts other parameters by decrease in value of one or more of the other parameters.

Certain embodiments of the present disclosure relate to search engine updating system. The search engine updating system may include one or more processors executing processor-executable instructions stored in one or more memory devices to perform a method. The method may include identifying a set of search queries in stored search queries, wherein the set of search queries correspond to a service, applying the identified set of search queries to the search engine to generate one or more search results for the service, wherein each search result has an assigned aggregate based on values of a set of parameters associated with the service, analyzing the values of the set of parameters to determine tradeoff point of each parameter, wherein the tradeoff point of a parameter occurs when updating the value of the parameter negatively impacts other parameters in the set of parameters, determining one or more weights to apply to the machine learning model based on the tradeoff points of the set of parameters, storing the determined one or more weights, wherein the stored weights are associated with the service corresponding to the identified set of stored search queries, and applying the determined one or more weights to the machine learning model for a search query corresponding to the service.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 2 is a flow diagram showing various exemplary components involved in generating match results of service provider search queries, according to some embodiments of the present disclosure.

FIGS. 3A-D show exemplary output produced by rank optimization module, according to some embodiments of the present disclosure.

DETAILED DESCRIPTION

Figure 1:
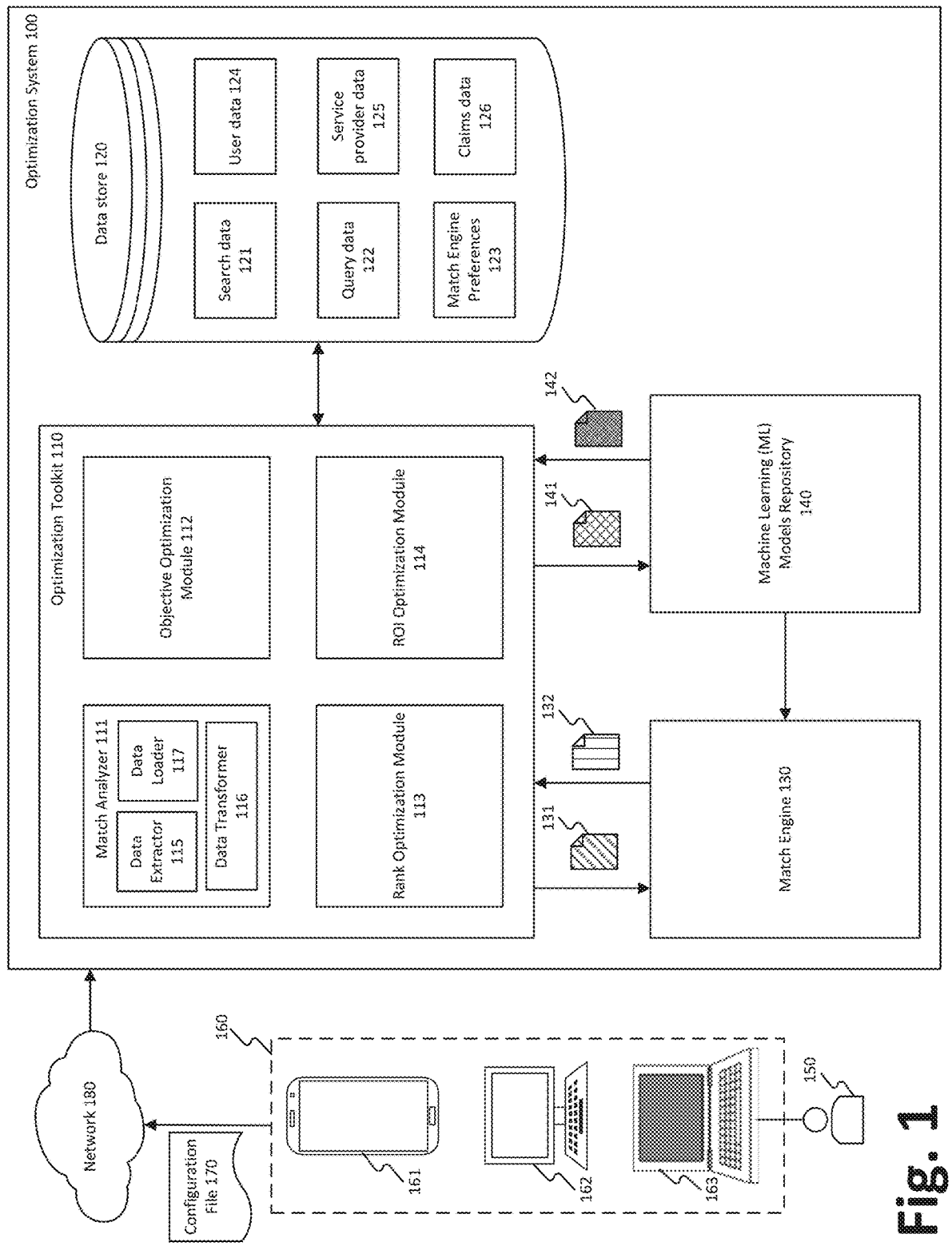
FIG. 1 is a block diagram showing an example optimization system for optimizing results of a search system, according to some embodiments of the present disclosure.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed simultaneously, at the same point in time, or concurrently. Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms thus cover both active forms, and passive forms, of sending and receiving.

The embodiments described herein provide technologies and techniques for evaluating large numbers of data sources and vast amounts of data used in the creation of a machine learning model. These technologies can use information relevant to the specific domain and application of a machine learning model to prioritize potential data sources. Further, the technologies and techniques herein can interpret the available data sources and data to extract probabilities and outcomes associated with the machine learning model's specific domain and application. The described technologies can synthesize the data into a coherent machine learning model, that can be used to analyze and compare various paths or courses of action.

These technologies can efficiently evaluate data sources and data, prioritize their importance based on domain and circumstance specific needs, and provide effective and accurate predictions that can be used to evaluate potential courses of action. The technologies and methods allow for the application of data models to personalized circumstances. These methods and technologies allow for detailed evaluation that can improve decision making on a case-by-case basis. Further, these technologies can evaluate a system where the process for evaluating outcomes of data may be set up easily and repurposed by other uses of the technologies.

Technologies may utilize machine learning models to automate the process and predict responses without human intervention. The performance of such machine learning models is usually improved by providing more training data. The quality of a search system results is evaluated to determine if the machine learning models used in a search system need to be updated. Embodiments of these technologies described can help improve search system results using the requested by a user.

FIG. 1 is a block diagram showing an exemplary optimization system 100 for optimizing results of a search system (such as match engine 130), according to some embodiments of the present disclosure. Optimizing results may include optimizing the weightage of various machine learning models used in generating search system results. Optimizing results may also include optimizing ranks of service providers included in search results. In some embodiments, optimization of results may include improving the return on investment. For example, optimization of return on investment for a user of a search system may include the conversion rate of users in accepting search results. For instance, a user of a search system for service providers may have a higher conversion rate by utilizing a service provider's services listed by the search system. Optimization system 100 may trigger optimization automatically based on updates to the search service (e.g., match engine 130). In some embodiments, a user of optimization system 100 may define optimization requests using a configuration file (such as configuration file 170).

An update to match engine 130 may be an update to a machine learning (ML) model utilized by match engine 130 in generating search results matching a search query. In some embodiments, the introduction of a new ML model may be considered an update to match engine 130.

Optimization system 100 may include an optimization definition for adjustment of search results generated by match engine 130. The adjustments may be achieved by presenting preferred levels of importance of various ML models utilized by match engine 130. The levels of importance may define the weightage to be given to a ML model in calculating the value of a search result. The adjusted ML models may be various factors associated with a search result. For example, a search system for service providers can include ML models for the cost of service, travel distance to service provider location, the effectiveness of service offered. Optimization system 100 may need to optimize the weightage of these ML models based on preferences (such as match engine preferences 123) of the user of match engine 130. Optimization system 100 may utilize the user preferences to evaluated optimization recommendations and apply weights to machine learning models or adjust the ranking of service providers in the match results.

As illustrated in FIG. 1, optimization system 100 may include optimization toolkit 110 to help simulate a search system, optimize the search system and its results, and data store 120 to store the optimization preferences and search results. Optimization system 100 may also include match engine 130 as an example search system to be optimized based on any updates or user requests and machine learning (ML) models repository 140 that stores all ML models utilized by match engine 130.

Optimization system 100 may optimize the performance of match engine 130 upon receiving a request from a user 150 using external user devices 160. User 150 may send the optimization request using configuration file 170. Optimization system 100 may receive the optimization request over network 180. User devices 160 may be a processor or a complete computing device, such as mobile device 161, desktop computer 162, laptop 163. In some embodiments, user devices 160 may be smart home appliances, IoT devices, etc. Configuration file 170 may include definitions of optimization needs and/or search system updates as identified by user 150 of user devices 160. Configuration file 170 and other information may be provided to optimization system 100 over network 180. In some embodiments, user 150 may provide a set of search queries in configuration file 170 to help adjust and optimize match engine 130.

As illustrated in FIG. 1, optimization toolkit 110 may include match analyzer 111 to help simulate the operation of a search system (such as match engine 130) and objective optimization module 112, rank optimization module 113, and return on investment (ROI) optimization module 114 to optimize the search system by reviewing the simulated search system results.

Match analyzer 111 may analyze the matches identified by a match engine 130 based on search requests provided by a user (e.g., user 150). Match analyzer simulates user demographics usage of match engine 130 by retrieving previous queries (such as query data 122) to match engine 130. Match analyzer 111 may select queries based on the preferences of the users of the system. Match analyzer 111 may select the combined preferences of multiple users that reflect the user demographics of match engine 130.

Objective optimization module 112 may help optimize match engine 130 based on a set of objectives. Objective optimization module 112 may optimize objectives by determining values of adjustable parameters to adjust ML models used by match engine 130 to produce match results that meet the objectives. For example, adjustable parameters may include parameters to optimize the cost and effectiveness of a service provider. For instance, a match engine for healthcare providers, such as physicians, may have objectives for a lower cost to the patient visiting the physician and maximum effect of clinical outcome upon visiting the physician. Adjustable parameters representing objectives may be set numerical values or a range of values. Match results of match engine 130 that meet these parameter values representing objectives are presented to the user of match engine 130 optimized using objective optimization module 112.

Objective optimization module 112 may optimize multiple objectives simultaneously using a multi-objective optimization approach where optimization of one objective does not impact the other objectives inversely. The multi-objective optimization approach achieves a Perito Front of solutions that improve each objective without impacting other objectives by blending multiple objectives. Objective optimization module 112 may apply weights to each of the objectives to optimize the objectives. Objective optimization module 112 may adjust the weights of the objectives when a new machine learning model or update to an existing machine learning model is introduced in the match engine 130. The process of achieving multi-objective optimization is described in detail in FIG. 5 description below.

Rank optimization module 113 may optimize the ranks of service provider match results of match engine 130. Rank optimizing may include identification of a list of priority service providers and sorting them based on various factors. Rank optimized priority lists may help in generating a call campaign list to improve the accuracy of service providers matched by match engine 130 and part of the priority list. Rank optimization module 113 may improve the accuracy of the identity of service providers using secondary verification of match results generated by a match engine 130. Secondary verification may be a call campaign to verify the service provider's details verbally. Service provider details may include working hours, availability, specializations, etc. Rank optimization module 113 may help generate a list of service providers that result in the most important service providers whose details need secondary verification.

Rank optimization module 113 may generate an initial version of a call list from the past match results, such as search data 121. Rank optimization module 113 may use a third-party tool such as JCurve to generate the service providers' initial call list. In some embodiments, rank optimization module 113 may generate a call list by reviewing new match results generated using previously conducted searches (e.g., query data 122) by simulating searches using match analyzer 111. Rank optimization module 113 may review previous searches in query data 122 to identify the most popular locations of origin of search providers' searches or locations and most popular search requests. Identification of popular search requests may include identifying popular types of service providers and popular types of service requests.

Rank optimization module 113 may be configurable to select search results of a percentage of popular locations and a percentage of popular search requests. Rank optimization module 113 may receive the service providers' rankings in the identified searches to help identify the priority list of service providers to consider for a call campaign. Rank optimization module 113 may need to determine a service provider's rank from the generated match results of previous queries in query data 122 or previous search results in search data 121. A service provider rank may include the service provider's position in the list of service providers generated for a search request. Rank optimization module 113 may aggregate the same service provider ranks in match results of different search requests to generate the overall rank of the service provider. Rank optimization module 113 may generate such combined ranks per type of service or type of search request. Rank optimization module 113 may generate a table of service providers with aggregate ranks of each service provider. Rank optimization module 113 may also generate supplemental tables for location details, search volumes for different service types, search request types, service providers. Supplementary tables generated by rank optimization module 113 may also include a discount function table with a discount amount to apply to each rank, indicating the likelihood of selection of a match result by a user of match engine 130 conducting a search request. A detailed description of output tables of data generated by rank optimization module 113 is presented in FIGS. 3A-D descriptions below.

Rank optimization module 113 may request match analyzer 111 to simulate match engine 130 to generate match results for rank optimization module 113 to review. In some embodiments, rank optimization module 113 may take the match as input results along with the population of locations where searches are conducted and users of match engine 130. Rank optimization module 113 may also take as input volume of each search request in order to generate optimized ranks of service providers to generate a priority list of service providers for various applications, including call campaign for data accuracy. Rank optimization module 113 may combine the search volume and population of match engine users in a location with a rank discount function to generate a new optimized rank of each match result. The ranks of a service provider may be aggregated across multiple locations to identify the service provider's optimized rank in match results across all locations. In some embodiments, service providers' ranks may be aggregated across multiple search requests to identify optimized rank across multiple search requests and indirectly across multiple locations. A detailed description of various components of rank optimization module 113 is provided in FIG. 6 description below.

ROI optimization module 114 may help determine the return in investment for a search conducted by a match engine 130 and return on investment for a search requested by a user (e.g., user 150). A user's return on investment may include the number of times match results generated by match engine 130 are utilized by the user requesting a search. Return on investment (ROI) calculations may include the utilization of match results in a location, service provider type, and search request type across multiple locations. ROI optimization module 114 may identify the top service types, search request types, and locations to determine and optimize the return on investments for those types of searches conducted on match engine 130.

ROI optimization module 114 may determine the return on investment values using match analyzer 111 to simulate searches and review the search results. ROI optimization module 114 may also review the utilization of match results by users of match engine 130. ROI optimization module 114 may identify the utilization data by reviewing user data 124 and claims data 126 that includes usages of match results as reported by service providers listed in the match results.

ROI optimization module 114 may be executed upon updating match engine 130. Match engine 130 updates may include inclusion of a new ML model by match engine 130. In some embodiments, match engine 130 updates may include revision to an existing ML model previously used by match engine 130. Match engine 130 updates may include updates to its ML models by adding new ML models and updating existing ML models.

Optimization toolkit 110 may rely on data store 120 to generate the necessary queries to simulate search system and store optimizations in data store 120. As illustrated in FIG. 1, data store 120 may also be storage for previously evaluated optimization settings.

Optimization toolkit 110 may communicate with match engine 130 to optimize the match engine 130 for various applications. Optimization toolkit 110 may share search query 131 and may receive match results 132 to review and optimize match engine 130. In some embodiments, match engine 130 may share updates to match engine 130 ML models as part of match results 132. A detailed description of match engine 130 is provided in FIG. 2 description below.

Match analyzer 111 may retrieve data from a variety of data sources (e.g., external reviews of service providers, claims data and healthcare records of individuals) and process the data so that it may be used with the remainder of optimization system 100. Match analyzer 111 may further include a data extractor 115, data transformer 116, and data loader 117 modules. Data extractor 115, data transformer 116 may work together to generate the data in data store 120. Data transformer 116 may connect the disparate data extracted by data sources by data extractor 115 and store in data store 120.

Data extractor 115 may retrieve data from data sources including data related to users in user data 124, service providers in service provider data 125, and user and service provider interactions in claims data 126. Each of these data sources may represent a different type of data source. For example, data source may be a database similar to data store 120. Data source may represent structured data, such as healthcare records and claims data of users of match engine 130. In some embodiments, data sources may be flat files, such as service providers reviews. Further, data sources may contain overlapping or completely disparate data sets. In some embodiments, data source may contain information about users in user data 124 while other data sources may contain various insurance claim and medical treatment data of users in user data 124. Data extractor 115 may interact with the various data sources, retrieve the relevant data, and provide that data to the data transformer 116.

Data transformer 116 may receive data from data extractor 115 and process the data into standard formats. In some embodiments, data transformer 116 may normalize data such as dates. For example, a data source for healthcare records may store dates in day-month-year format while data source for claims data may store dates in year-month-day format. In this example, data transformer 116 may modify the data provided through data extractor 115 into a consistent date format. Accordingly, data transformer 116 may effectively clean the data provided through data extractor 115 so that all of the data, although originating from a variety of sources, has a consistent format. For example, claims data may include middle names of users in user data 124 but healthcare records may not include the middle names. In the second example, data transformer 116 may include the missing middle name in healthcare records.

Moreover, data transformer 116 may extract additional data points from the data sent by data extractor 115. For example, data transformer 116 may process a date in year-month-day format by extracting separate data fields for the year, the month, and the day. Data transformer 116 may also perform other linear and non-linear transformations and extractions on categorical and numerical data such as normalization and demeaning. Data transformer 116 may provide the transformed and/or extracted data to data loader 117. In some embodiments, data transformer 116 may store the transformed data in data store 120 for later use by data loader 117 and other modules of match analyzer 111.

Data loader 117 may receive the normalized data from data transformer 116. Data loader 117 may merge the data into varying formats depending on the specific requirements of optimization system 100 and store the data in an appropriate storage mechanism such as data store 120.

Optimization toolkit 110 may communicate with ML models repository 140 to provide weightage 141 to apply to various ML models supplied to match engine 130 to generate match results. Optimization toolkit may receive updates 142 from ML models repository 140 with metrics of various ML models performance and updates to ML models repository 140.

In various embodiments, data store 120 and ML Models repository 140 may take several different forms. For example, data store 120 may be an SQL database or NoSQL database, such as those developed by MICROSOFT™, REDIS, ORACLE™, CASSANDRA, MYSQL, various other types of databases, data returned by calling a web service, data returned by calling a computational function, sensor data, IoT devices, or various other data sources. Data store 120 may store data that is used or generated during the operation of applications, such as rank optimization module 113. For example, if rank optimization module 113 is configured to generate measures specific to service providers in service provider data 125, then data store 120 may store service providers' evaluated ranks. In some embodiments, data store 120 and ML models repository 140 may be fed data from an external source, or the external source (e.g., server, database, sensors, IoT devices, etc.) may be a replacement. In some embodiments, data store 120 and ML models repository 140 may be data storage for a distributed data processing system (e.g., Hadoop Distributed File System, Google File System, ClusterFS, and/or OneFS). Depending on the specific embodiment of data store 120 and ML models repository 140 may be optimized for storing and processing data in data store 120 and ML models repository 140.

Optimization system 100, upon parsing the configuration file 170, may detect the requested optimization preference and determine that it may need to execute a certain set of search queries to optimize match engine 130. Configuration file 170 may be presented as name-value pairs used to define the measurements requested by user 150 of user devices 160. Configuration file 170 may include a description of preferences. In some embodiments, configuration file 170 may also include types of service as criteria for filtering the service providers.

Optimization system 100 may provide a graphical user interface to define measures and generate a configuration file (e.g., configuration file 170). In some embodiments, optimization system 100 may provide various optimization preferences previously defined by a user in a dropdown UI. A user may generate a configuration file by selecting preferences using a GUI. In some embodiments, optimization system 100 may allow editing of selected preferences. Optimization system 100 may also include the ability to store the revised optimization preferences with new identifiers in data store 120 as match engine preferences 123. Configuration file 170 may be a YAML file. The use of structured languages such as YAML to format configuration files and repurposing measures using a GUI may help standardize performance measures and easy generation of requests for measures. Configuration file 170 is received by optimization system 100 via network 180.

Network 180 may take various forms. For example, network 180 may include or utilize the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, or other types of network communications. In some embodiments, network 180 may include an on-premises (e.g., LAN) network, while in other embodiments, network 180 may include a virtualized (e.g., AWS™, Azure™, IBM Cloud™ etc.) network. Further, network 180 may in some embodiments be a hybrid on-premises and virtualized network, including components of both types of network architecture.

FIG. 2 is a block diagram of an exemplary match engine 130 of FIG. 1, according to some embodiments of the present disclosure. As shown in FIG. 2, the internals of an exemplary match engine 130, which includes an online ranking service 210, may help in generating match results of service providers (e.g., match results 132) in response to a query (e.g., query 131). Generation of match results 132 may include ordered listing and grouping of service providers.

As shown in FIG. 2, match engine 130 may comprise the online ranking service 210 to help determine the ranked order of the service providers determined to be part of a matched results set of service providers shared with a user (e.g., user 150). The online ranking service 210 may be replicated multiple times across multiple computers of a cloud computing service (not shown in the figure). The multiple instances 211-214 of online ranking service 210 may help with handling multiple users' queries simultaneously. The optimization system 100 (not shown in the figure) may forward query 131 to online ranking service 210 to help determine the match results 132.

Match engine 130 may also include a load balancer 220 to manage load of users' queries sent to the online ranking service 210. Load balancer 220 may manage the users' query load by algorithmically selecting an online ranking service instance of online ranking service instances 211-214. For example, load balancer 220 may receive query 131 from laptop device 163 and forward it to online ranking service instance 211. In some embodiments, load balancer 220 may go through a round-robin process to forward the user queries to online ranking service instances 211-214. In some embodiments, online ranking service instances 211-214 may each handle different types of user queries. The type of query may be determined by load balancer 220.

The ranking method followed by online ranking service 210 may depend on the determined type of query 131. In some embodiments, the ranked results generated by a set of online ranking service instances may be combined together by another set of online ranking service instances. For example, an online ranking service instance may rank based on the quality of healthcare provided, and another instance may rank based on the efficiency of the healthcare provider, and a third online ranking service may create composite ranks based on the ranking of service providers based on quality and efficiency.

Online ranking service 210 may utilize ML models to rank service providers. Online ranking service 210 may obtain the service providers through a set of ML models in ML models repository 140 and then rank them using another set of ML models in ML models repository 140. The ML models used for processing the identified service providers may reside in in-memory cache 230 for quick access. The ML models in in-memory cache 230 may be pre-selected or identified based on a query (e.g., query 131) sent by a user (e.g., user 150). The match engine 130 may include a model cache 231 to manage the ML models in in-memory cache 230. In some embodiments, model cache 231 may manage the models by maintaining a lookup table for different types of ML models. Model cache 231 may maintain and generate statistics about the ML models in in-memory cache 230. In some embodiments, model cache 231 may only manage copies of models upon a user request. Model cache 231 may only include a single copy of each model in in-memory cache 230. In some embodiments, model cache 231 may also include multiple instances of the same ML models trained with different sets of data present in data store 120.

Online ranking service 210 may also utilize features used to identify the occurrence of certain events in user data 173 to help generate match results. The occurrences of certain events may describe the state of the user and may help in predicting potential future events occurrence. Match engine 130 may also store features used in predicting future events in feature bank 232. Online ranking service 210 may use the features in feature bank 232 as input to ML models in model cache 231 to predict best suited service providers to be included in match results 132. The features in feature bank 232 may also help in selecting ML models in model cache 231 for determining the order of the service providers. The list of service providers being ordered may be determined by optimization system 100 (not shown in the figure). Online ranking service 210 may request match engine 130 to identify the service providers prior to ordering the filtered set of service providers.

ML models in in-memory cache 230 may be regularly copied from a key-value pair database 250 containing the trained ML models of ML models repository 140. Database 250 may access ML models in ML models repository 140 using a model cache API 260. In some embodiments, ML models repository 140 may be part of file system 280. Database 250 may access ML models in ML models repository 140 to train the model at regular intervals. In some embodiments, database 250 may access ML models repository 140 to identify new features of a user based on the observed features currently residing in features repository 240. Database 250 may access the observed featured in features repository 240 using feature bank API 270. Database 250 supplies the trained ML models and features determined using ML models to in-memory cache 230 to be managed by model cache 231 and feature bank 232, respectively. The accessed features and ML models residing in database 250 and in-memory cache may be utilized by both online ranking service 210 and other services that are part of optimization system 100.

FIGS. 3A-D show exemplary output data produced by rank optimization module 113, according to some embodiments of the present disclosure. Tables 310-340 may include service provider rank table 310 and other supplementary tables 320-340. Rank optimization module 113 may store tables 310-340 in data store 120 (as shown in FIG. 1).

FIG. 3A illustrates an exemplary table 310 of fields of the service providers present in various match results generated by match engine 130. The service provider data includes the aggregated ranks across various search requests applied by match analyzer 111 to match engine 130. Table 310 also includes the search terms for which service provider's aggregated rank was calculated by rank optimization module 113.

FIG. 3B illustrated an exemplary table 320 of fields indicating the number of users of match engine 130 in each location subscribed by a customer. For example, a match engine search system for healthcare providers may populate the employer providing insurance as a customer of search and their employees as users of the match engine in a location. User count per location as defined in table 320 may help rank optimization module 113 to determine potential top locations where searches may be conducted. In some embodiments, table 320 may be used by objective optimization module 112 and ROI optimization module 114 to identify the top locations for searches conducted using match engine 130.

FIG. 3C illustrates an exemplary table 330 of the search volume fields for each type of search request. Similar to table 320, table 330 may be utilized by objective optimization module 112 and ROI optimization module 114 to identify top searches conducted using match engine 130. Search term filed may represent the type of search request conducted on match engine 130. For example, a match engine search system for healthcare providers may consider a search for a particular symptom (such as lower backache) to be a type of search request.

FIG. 3D illustrated an exemplary table 340 of fields of rank discount function with values of rank and discount amount to apply for each rank. In some embodiments, there may be multiple rank discount function tables for each service type and each type of search request.

Figure 4:
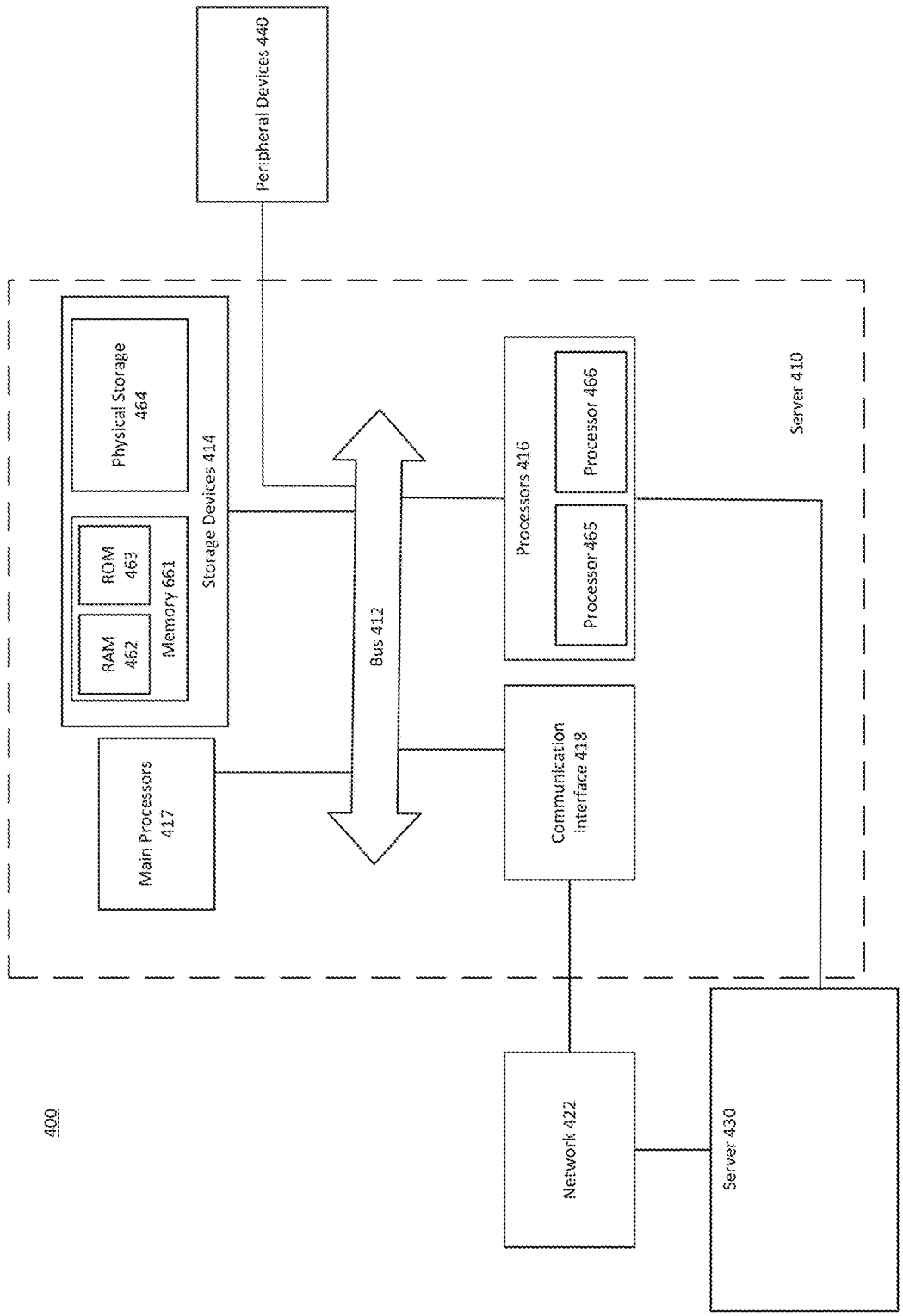
FIG. 4 illustrates a schematic diagram of an exemplary server of a distributed system, according to some embodiments of the present disclosure.

FIG. 4 illustrates a schematic diagram of an exemplary server of a distributed system, according to some embodiments of the present disclosure. According to FIG. 4, server 410 of distributed computing system 400 comprises a bus 412 or other communication mechanisms for communicating information, one or more processors 416 communicatively coupled with bus 412 for processing information, and one or more main processors 417 communicatively coupled with bus 412 for processing information. Processors 416 can be, for example, one or more microprocessors. In some embodiments, one or more processors 416 comprises processor 465 and processor 466, and processor 465 and processor 466 are connected via an inter-chip interconnect of an interconnect topology. Main processors 417 can be, for example, central processing units ("CPUs").

Server 410 can transmit data to or communicate with another server 430 through a network 422. Network 422 can be a local network, an internet service provider, Internet, or any combination thereof. Communication interface 418 of server 410 is connected to network 422, which can enable communication with server 430. In addition, server 410 can be coupled via bus 412 to peripheral devices 440, which comprises displays (e.g., cathode ray tube (CRT), liquid crystal display (LCD), touch screen, etc.) and input devices (e.g., keyboard, mouse, soft keypad, etc.).

Server 410 can be implemented using customized hard-wired logic, one or more ASICs or FPGAs, firmware, or program logic that in combination with the server causes server 410 to be a special-purpose machine.

Server 410 further comprises storage devices 414, which may include memory 461 and physical storage 464 (e.g., hard drive, solid-state drive, etc.). Memory 461 may include random access memory (RAM) 462 and read-only memory (ROM) 463. Storage devices 414 can be communicatively coupled with processors 416 and main processors 417 via bus 412. Storage devices 414 may include a main memory, which can be used for storing temporary variables or other intermediate information during execution of instructions to be executed by processors 416 and main processors 417. Such instructions, after being stored in non-transitory storage media accessible to processors 416 and main processors 417, render server 410 into a special-purpose machine that is customized to perform operations specified in the instructions. The term "non-transitory media" as used herein refers to any non-transitory media storing data or instructions that cause a machine to operate in a specific fashion. Such non-transitory media can comprise non-volatile media or volatile media. Non-transitory media include, for example, optical or magnetic disks, dynamic memory, a floppy disk, a flexible disk, hard disk, solid state drive, magnetic tape, or any other magnetic data storage medium, a CD-ROM, any other optical data storage medium, any physical medium with patterns of holes, a RAM, a PROM, and an EPROM, a FLASH-EPROM, NVRAM, flash memory, register, cache, any other memory chip or cartridge, and networked versions of the same.

Various forms of media can be involved in carrying one or more sequences of one or more instructions to processors 416 or main processors 417 for execution. For example, the instructions can initially be carried out on a magnetic disk or solid-state drive of a remote computer. The remote computer can load the instructions into its dynamic memory and send the instructions over a telephone line using a modem. A modem local to server 410 can receive the data on the telephone line and use an infra-red transmitter to convert the data to an infra-red signal. An infra-red detector can receive the data carried in the infra-red signal, and appropriate circuitry can place the data on bus 412. Bus 412 carries the data to the main memory within storage devices 414, from which processors 416 or main processors 417 retrieves and executes the instructions.

Optimization toolkit 110 or one or more of its components may reside on either server 410 or 430 and may be executed by processors 416 or 417. Match engine 130 or one or more of its components may also reside on either server 410 or 430. In some embodiments, optimization system 100 may completely reside on either server 410 or 430. In some embodiments, the components of optimization toolkit 110 and/or recommendation engine 300 may be spread across multiple servers 410 and 430. For example, optimization toolkit 110 components 111-114 may be executed on multiple servers. Similarly, online ranking service instances 211-214 may be maintained by multiple servers 410 and 430.

Figure 5:
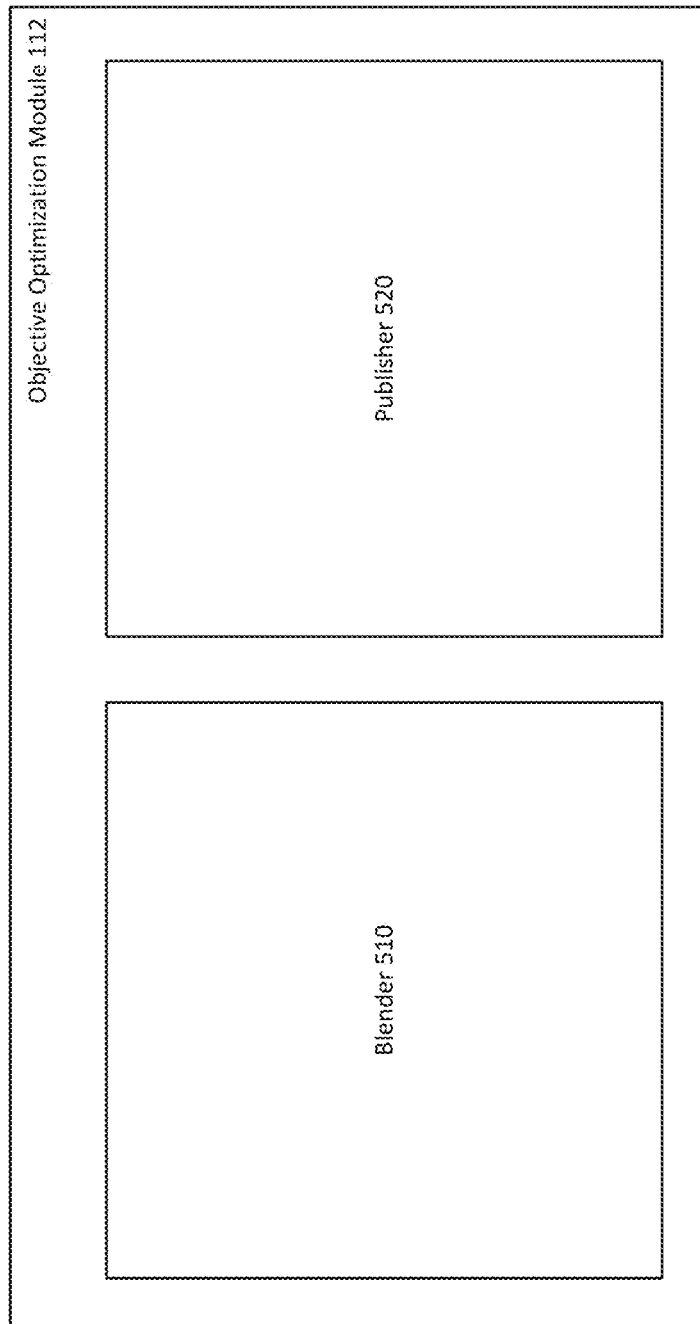
FIG. 5 is a block diagram showing various exemplary components of objective optimization module, according to some embodiments of the present disclosure.

FIG. 5 is a block diagram showing various exemplary components of objective optimization module, according to some embodiments of the present disclosure.

Match analyzer 111 may utilize objective optimization module 112 to optimize multiple objectives by blending different service provider interaction dimensions with the user of match engine 130 searching for service providers. For example, a match analyzer 111 in a healthcare setting may optimize healthcare providers' search results by blending dimensions like clinical factors, conversion/convenience, cost, etc., to obtain the provider score for ranking the service providers. Objective optimization module 112 may blend various service provider interactions by considering it a multi-objective optimization problem.

As illustrated in FIG. 5, objective optimization module 112 components may include blender 510 and publisher 520 to simultaneously optimize multiple dimensions using a multi-objective optimization framework and publish machine learning (ML) models that meet the blended objectives.

Blender 510 may determine a reasonable tradeoff between different dimensions of service provider interactions based on experience and ongoing experimentation. Blender 510 may use a ML model to determine the tradeoff points between different dimensions such as cost, convenience, and quality of service such that the improvement of one dimension does not negatively impact another dimension. Blender 510 may represent dimensions of a service provider interaction as parameters to an ML model. The parameters of blender 510 may be determined by applying standard multi-objective optimization techniques.

Blender 510 may use a sequential optimization method to blend cost factors of a service provider interaction with combined conversion and service effectiveness factors of the same interactions. Blender 510 may combine factors by combining effectiveness scores and conversion scores of each service provider interaction between a service provider and a user of match engine 130 where a service provider is listed. A conversion score is calculated based on a service provider's utilization by a user of match engine 130, where a service provider is listed as a match result. The effectiveness score is based on the quality of the service rendered by a service provider to a user who selected the service provider from the match results of a search on match engine 130. Blender 510 may need to baseline the combined scores by identifying the top result among the combined scores. The service provider interaction with the highest score may be considered a top result. Blender 510 may identify a top result by sorting the combined scores of service provider interaction and selecting the highest score. Blender 510 may baseline the combined scores by identifying the higher value results than the baseline top score. Blender 510 may generate a baseline top score by subtracting an error amount from the top result's combined score. Blender 510 may sort the top n combined score results based on a third factor of cost. Cost factors may include a unit cost of service and the additional amount paid for the service that is considered as a waste expense. In some embodiments, the additional amount that does not improve the service provider interaction's combined score is considered a waste expense. Blender 510 may determine the waste expense by reviewing the claims data 176, including details of service provider interactions. The ordered list based on cost factors is the optimized list of service providers for similar service provider interactions that are optimized for multiple objectives of cost, conversion, and service effectiveness. The ordered list may help identify the least cost needed to get the highest effectiveness score and high conversion score to benefit both service providers and users of match engine 130 searching for service providers.

In some embodiments, objective optimization module 112 may utilize a hybrid approach for blending objectives by only sorting interactions with top scores in each type of search. In some embodiments, a set of top results are selected reranked by sorting them according to their combined effectiveness and conversion scores. In some embodiments, multiple optimization methods may be applied to subsets of service provider interactions.

The ordered service provider interaction results help determine the weightage to apply to different ML models used for achieving the optimized objectives. Blender 510 may be executed when a new ML model is introduced in the match engine 130 by determining the weight to apply to the new ML model and adjustments to other existing ML models used by match engine 130. Blender 510 may be executed upon updating an existing ML model used by match engine 130.

Publisher 520 may publish a machine learning (ML) model by allowing its inclusion in the ML models repository 140. Publisher 520 may help publish updated and new machine learning models included in generating search results using match engine 130. Publisher 520 may publish an ML model based on blended objective optimization scores determined by blender 510.

Publisher 520 may publish a ML model if metrics of service provider interactions such as cost and quality are in a feasibility region upon including the ML model in match engine 130. Publisher 520 may determine the feasibility region of metrics by requesting match analyzer 111 to run match engine 130 for metrics of interest. For example, match analyzer 111 may execute a set of queries on match engine 130 to generate results biased on quality of service offered by a service provider and results biased on the distance of the service provider from the user of match engine 130 to evaluate impact to quality and travel distance metrics based on an introduction of a new ML model. If the evaluated metrics are not in the feasibility region, then publisher 520 may adjust the weights downstream ML models used by match engine 130. The ML model's adjusted weights and adjusted ML models are then published by publisher 520 to be used in future searches conducted using match engine 130.

Figure 6:
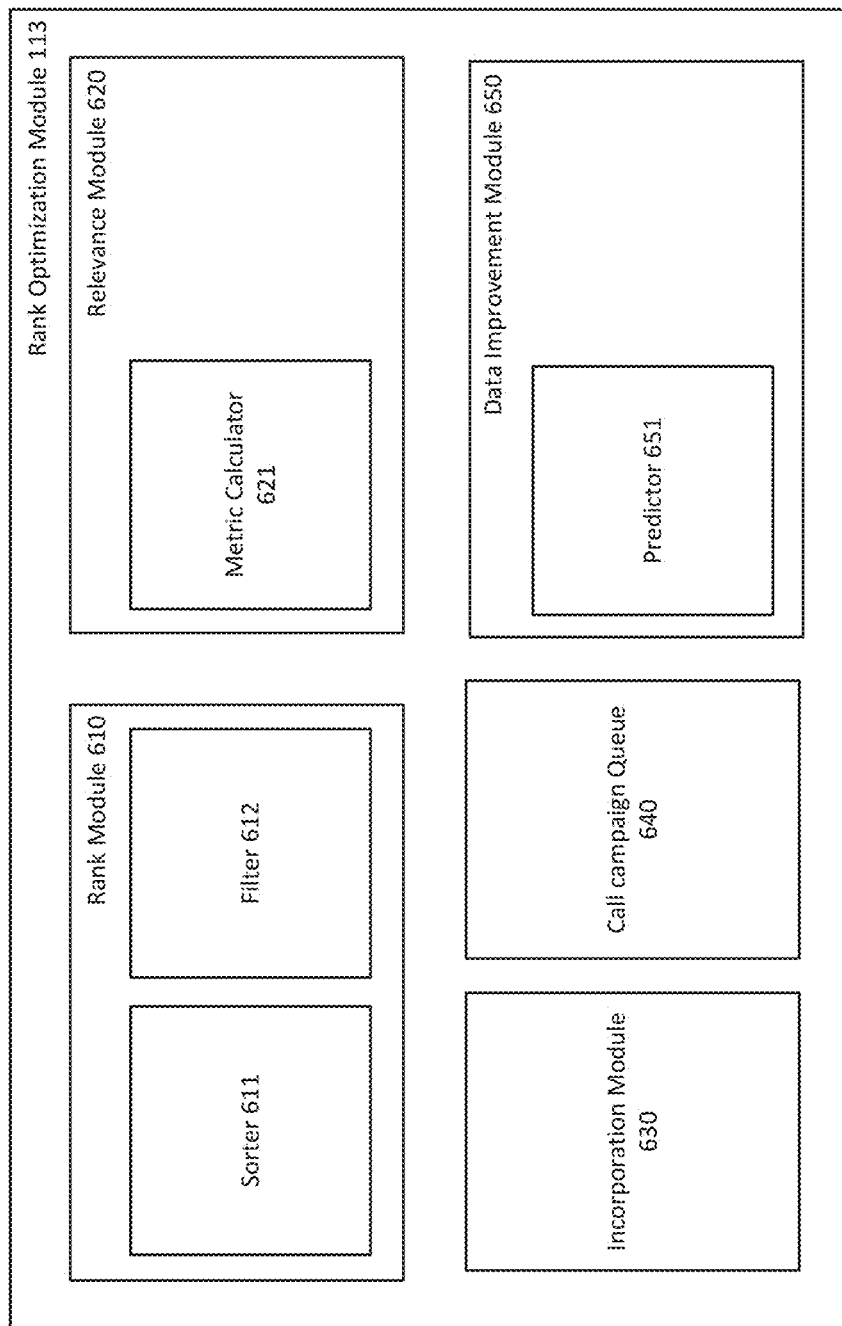
FIG. 6 is a block diagram showing various exemplary components of a rank optimization module, according to some embodiments of the present disclosure.

FIG. 6 is a block diagram showing various exemplary components of a rank optimization module 113, according to some embodiments of the present disclosure. Rank optimization module 113 may determine the ranked order of high value service providers amount the service providers presented in match results of match engine 130. Such ranked order of high value service providers may be used for selecting the service providers for improving their data accuracy and, in turn, optimize match engine 130. Improved accuracy of service provider data presented by match engine 130 can result in user of match engine 130 utilizing the service providers' services. Rank optimization module 113 may generate a high value service provider's ranked order for a call campaign to acquire accurate data of the service providers.

In order to improve the accuracy of stored service provider data (e.g., service provider data 174 of FIG. 1), rank optimization module 113 may determine supplemental data of a higher quality to combine with existing service provider data 174. Rank optimization module 113 determination of higher quality supplemental data may require a more precise determination of service providers to communicate for accurate data. Determination of service providers helps reduce the cost of determining supplemental data of a higher quality to improve the accuracy of the service provider data 174. Rank optimization module 113 may keep service providers' count to improve data accuracy low by identifying high value service providers presented in most popular search locations and most popular search types among searches conducted on match engine 130.

As illustrated in FIG. 6, rank optimization module 113 components may include rank module 610, relevance module 620 to identify a subset of ranked and ordered list of service providers for conducting a call campaign to improve the service providers' data accuracy. Rank optimization module 113 may also include incorporation module 630, call campaign queue 640 to incorporate data updates obtained via call campaigns.

Rank optimization module 113 working on the generation of a call campaign list, may determine the priority of service providers, the volume of calls per service provider type, and locations (such as postal codes) to generate the actual call list based on data value and relevancy of service providers using rank module 610 and relevance module 620.

Rank optimization module 113 may utilize a third-party tool to improve the accuracy of service provider data of a set of service providers identified by rank optimization module 113. The third-party tool may provide higher quality data from third-party databases such as Zelis and Enclarity to improve the accuracy of the service provider data 125. In some embodiments, rank optimization module 113 may supplement service provider data 125 with data provided by calls to offices of service providers. A call campaign to obtain higher quality accurate data of service providers may include optimizing the call campaign to reduce the number of service providers to call.

Rank optimization module 113 may optimize call campaigns by prioritizing service providers that may be contacted to maximize the benefit to members searching for service providers on match engine 130. Match analyzer 111 may utilize search data 121 to identify service providers in service provider data 125 that may need to be included in a call campaign. In some embodiments, match analyzer 111 may be used to simulate searches for providers on match engine 130 to generate search data. Rank optimization module 113 may use the search data obtained from match engine 130 to determine the high value service providers whose data accuracy may need to be improved.

Rank module 610 may prioritize the service providers to call to access the latest data, for example, available data by ranking service providers. Rank module 610 can identify a prioritized ordered list of service providers using sorter 611 and filter them for a subset of high value service providers using filter 612.

Filter 612 may filter for high value service providers based on various service provider factors. Service provider factors may include locations with high usage of service providers listed by match engine 130, most popular service types searched using match engine 130, and higher quality score of service providers. In some embodiments, servicer provider factors may also include a high likelihood of availability.

Filter 612 may utilize machine learning models of ML models repository 140 (as shown in FIG. 1) to determine the quality score and availability of service providers. In some embodiments, service provider factors may include the utilization of services of service providers identified by match engine 130 and availability of service providers in a network of service providers. For example, a match engine search system (such as match engine 130) used for searching healthcare providers may be filtered by filter 612 based on the availability of service provider in the network of the healthcare insurance of user of the match engine. Similarly, in another instance, the healthcare provider's utilization by a user of the match engine is determined based on the presence of the user's name in the claims data 126.

Sorter 611 can determine the order in which high quality service providers need to be identified for a call campaign. Ordering of service providers may include deciding the percentage of total call volume to allocate to each service type or search request type or location. In one embodiment, such call volume allocation may be based on the number of users of match engine 130 in a location, such as a postal code. For example, call allocation for healthcare providers search system may be based on insurance members concentration in each Primary Care Service Area (PCSA), Hospital Service Area (HSA), or Hospital Referral Region (HRR), and contact that number of healthcare providers in each PCSA/HSA/HRR in order of descending quality.

In some embodiments, sorter 611 may need to determine the total call volume distribution based on the service type of the service providers availability. Sorter 611 may determine the service type call distribution based on the actual search volumes for service providers present in search data (e.g., search data 121). In some embodiments, sorter 611 may also evaluate service providers' usage data listed by match engine 130 based on searches conducted by a user. For example, usage data may include claims data of healthcare providers frequently visited by members, billed as in-network, and who may not have been previously identified and may be needed to determine the order of campaign calls to service providers.

Rank module 610, in addition to prioritizing calling service providers, may determine the number of providers that need to be called to accomplish certain goals. Sorter 611, after prioritizing call campaign order based on the listed service provider factors, may provide the results as input to filter 612 to identify the number of service providers to consider in the suggested order of service providers. Filter 612 may evaluate metrics by service type to determine the call volume for each sorted list of service providers. The metrics may include an average number of users of match engine 130 utilizing a service provider's services, percentage of users who have used the services of more than one service provider. These metrics related to user interaction with match engine 130 may be defined based on user data 124. In some embodiments, filter 612 may evaluate metrics for the average quality of service providers. The average quality of service providers may be determined using service provider data 125.

Filter 612 may also conduct staleness analysis to determine the confidence score of data associated with ordered high value service providers in service provider data 125. Filter 612 may also review claims of claims data 126 associated with a service provider for staleness analysis. Filter 612 may define the loss of confidence in the service provider data as a function of time. Based on the staleness analysis, service providers whose data needs to be updated may be included in the call campaign queue 640.

Relevance module 620 helps determine the importance of the ranked service providers to adjust service providers ordering based on the service providers' importance. Relevance module 620 may use metric calculator 621 to calculate service providers' importance metrics to adjust their call order accordingly.

Metric calculator 621 may generate the relevant metrics to determine the importance of each service provider to be included in a call campaign list to improve the relevant service providers' data accuracy. Determination of the importance of service providers may have other alternate applications. For example, determining the importance of healthcare service providers may assist in assessing the projected clinical impacts and return on investment for a customer evaluated by ROI optimization module 114 (as shown in FIG. 1). Return on investment analysis may be used to generate geography-specific top service providers for users of match engine 130 to give tangible examples of the caliber of service providers recommended by match engine 130. Such service provider importance data may also help identify the highest impact service provider practices, for example, in hospitals or other networks. Metric calculator 621 may calculate the importance of a service provider based on a service provider's rank in a location, such as a postal code and contact score of the service provider in the same location.

In some embodiments, relevance module 620 may utilize match analyzer 111 to determine the importance of each service provider's data to develop the call campaign list. The rank of a service provider may depend on the location and service type of the service provider. Match analyzer 111 may simulate searches on match engine 130 to include a search request for each service type for each location and record the service providers' rankings for each such search. In some embodiments, match analyzer 111 may only consider a percentage of top service types and locations. A user of optimization system 100 may provide a configuration file (e.g., configuration file 170 of FIG. 1) with the percentage value of top service types and locations to consider.

Metric calculator 621 may evaluate a service provider's contact score metric in a location for performing a particular type of service based on the number of users in the location using the match engine 130, and search volume for all search terms that route to a type of service. Metric calculator 621 may rely on the service provider's rank in the search and the discount function, which may predict the relative probability of conversion as a function of rank in the search results.

Match engine 130 may present the same service providers to its user in multiple locations and multiple service-type queries. A service provider contact score metric may be proportional to the number of times a service provider present in search results is utilized by a user of match engine 130 to whom the service provider was provided as a match result. Relevance module 620 may aggregate the contact score of a service provider from multiple searches.

After identification of call volumes per service type using rank module 610 and actual service providers meeting the call volume quotas using relevance module 620, incorporation module 630 may incorporate the identified service providers into call campaign queue 640. Call campaign queue 640 may be a queue data structure stored in data store 120. The call campaign tool may use the service providers listed in call campaign queue 640.

Data improvement module 650 may help improve service provider data accuracy by improving availability data by resolving conflicts between supplemental data sources. Data improvement module 650 may resolve conflicts by determining the quality of each data source. Data improvement module 650 may compare the supplemental data from a third-party data source to the data collected using a call campaign conducted by calling the service providers on the call campaign list to determine the supplemental data's accuracy. Data improvement module 650 may also review the latest modification date of the data source and changes to the data in determining the accuracy of the data source. For example, a data source with a very old modification date and or no changes to the data may be considered not an accurate data source.

Data improvement module 650 may utilize a classifier to model which data to surface to users of match engine 130. A classifier may determine the confidence score of the service provider's data identified by relevance module 620. Data improvement module 650 may reduce the weight of the provider ranking using a discount function. Predictor 651 may help monitor the changes in confidence scores and add service providers to the call campaign queue 640 for the next iteration of the call campaign.

Predictor 651, after determining low confidence score data of a service provider, may add the service provider to call campaign queue 640. Predictor 651 may only add those service providers who have been considered high value by filter 612 and are not already present in call campaign queue 640. Predictor 651 closes the loop of continuous improvement of data accuracy of service providers listed in match results generated by match engine 130.

Figure 7:
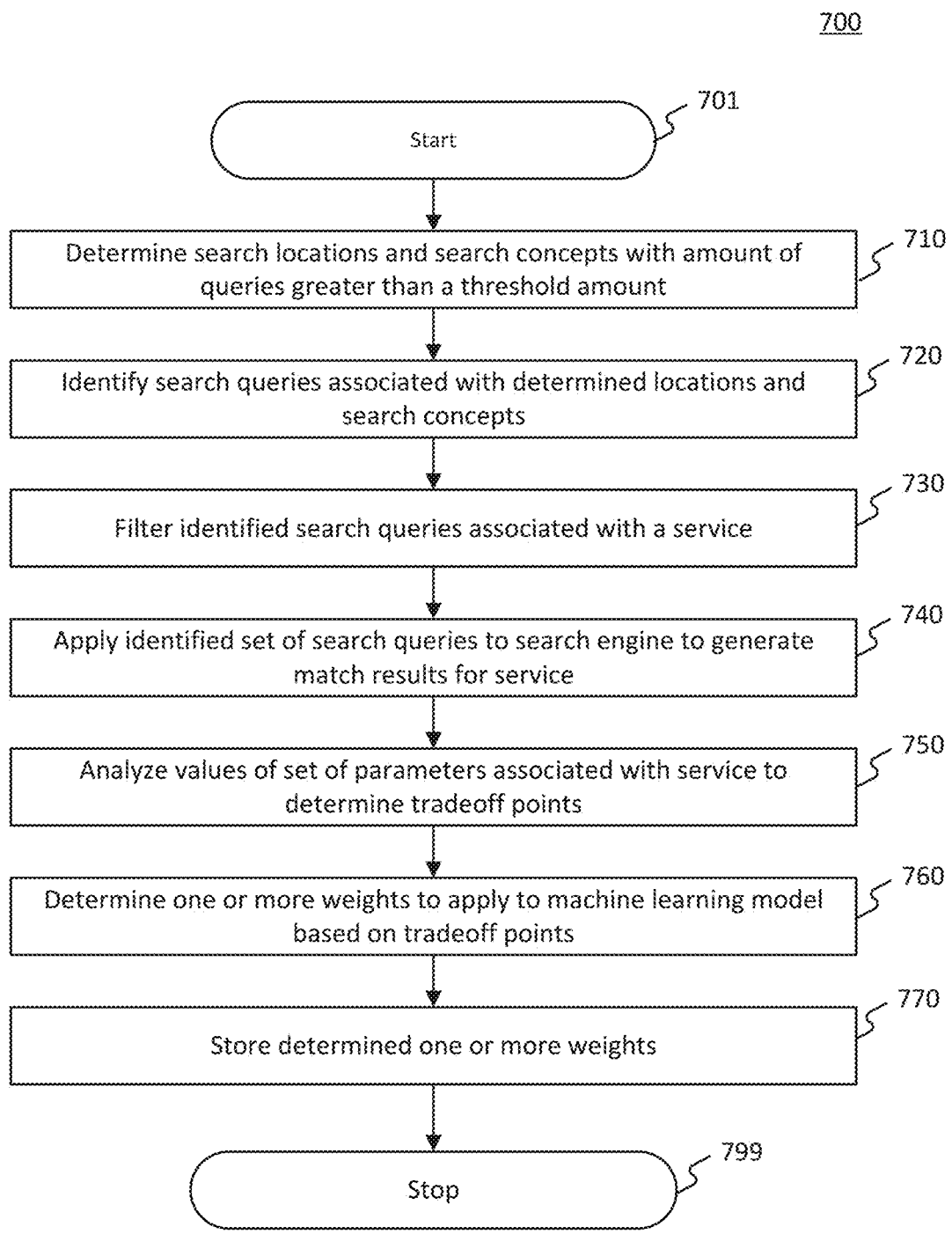
FIG. 7 is a flowchart showing an exemplary method for objective optimization of revised search system with updated machine learning models, according to some embodiments of the present disclosure.

FIG. 7 is a flowchart showing an exemplary method for objective optimization of match engine 130 with updated ML models, according to some embodiments of the present disclosure. The steps of method 700 can be performed by, for example, optimization system 100 of FIG. 1 executing on or otherwise using the features of distributed computing system 400 of FIG. 4 for purposes of illustration. It is appreciated that the illustrated method 700 can be altered to modify the order of steps and to include additional steps.

In step 710, optimization system 100 may determine search locations with a number of queries greater than a threshold amount. Optimization system 100 may identify search locations, for example, postal codes of users of match engine 130 with search volume greater than a threshold amount. Rank module 610 (as shown in FIG. 6) may be utilized to identify the search locations with a number of queries exceeding a threshold amount. In some embodiments, optimization system 100 may utilize the secondary output table 320 (as shown in FIG. 3) produced by rank optimization module 113 to identify search locations exceeding a threshold amount. In some embodiments, optimization system 100 may review search data 121 that includes previously generated match results for search queries to identify search locations with volume greater than a threshold amount.

In some embodiments, optimization system 100 may identity search concepts with search volume greater than a threshold amount. For example, optimization system 100 may identify service request type in searches on match engine 130 exceeding a threshold amount. In another instance, optimization system 100 may identify service type of service provider searches on match engine 130 exceeding a threshold amount. Rank module 610 (as shown in FIG. 6) may be utilized to identify the service type and search request type queries exceeding a threshold amount. Optimization system 100 may utilize the secondary output table 330 (as shown in FIG. 3C) produced by rank optimization module 113 to identify search concepts exceeding a threshold amount. In some embodiments, optimization system 100 may review search data 171 to identify search concepts with volume greater than a threshold amount.

In step 720, optimization system 100 may identify search queries from determined locations and search concepts in step 710 by reviewing query data 122 (as shown in FIG. 1). Optimization system 100 may review only those queries in query data 122, including the identified locations and search concepts. In some embodiments, optimization system 100 may determine search queries from match results and usage of service providers presented in match results that included service providers from the locations identified in step 710 and service types identified in step 710. Optimization system 100 may review match results in search data 121 (as shown in FIG. 1) that include the identified location and service type details in step 710 to trace back the search queries submitted to match engine 130. In some embodiments, optimization system 100 may review claims data 126 to identify interactions of users of match engine 130 with service providers and predict potential search queries leading to the interactions. Optimization system 100 may use an ML model in ML models repository 140 to predict the search queries from search data 121 and claims data 126.

In step 730, optimization system 100 may filter search queries determined in step 720 associated with a service that includes a specific service type or service provider type. Filter 612 (as shown in FIG. 6) may be used to filter search queries by a service type or a service provider. In some embodiments, a set of service types and service provider types may be used to filter search queries from step 720.

In step 740, optimization system 100 may apply identified set of search queries to a search engine such as match engine 130 (as shown in FIG. 1) to generate match results for a service. Match analyzer 111 (as shown in FIG. 1) may simulate searches on match engine 130 to generate match results for service types and service provider types identified in step 730.

In step 750, optimization system 100 may analyze values of a set of parameters associated with service to determine tradeoff points where optimization of one parameter negatively affects other parameters. Parameters associated with a service are based on objectives configured by a user of match engine 130. Objective optimization module 112 (as shown in FIG. 1) may determine the parameters associated with a service based on the configured objectives. Objective optimization module 112 may utilize an ML model in ML models repository 140 (as shown in FIG. 1) to determine the set of parameters associated with a service. Blender 510 (as shown in FIG. 5) of objective optimization module 112 may be used to identify the tradeoff points between parameters. Blender 510 may determine tradeoff points by blending multiple objectives represented by parameters using a sequential optimization or a hybrid optimization as discussed in FIG. 5 description above.

In step 760, optimization system 100 may determine one or more weights to apply to machine learning models in ML models repository 140 (as shown in FIG. 1) based on tradeoff points identified in step 750. Publisher 520 (as shown in FIG. 5) may determine whether values of parameters upon introduction of a new ML model or an updated existing ML model is still not crossing the tradeoff points and is in the feasible region. Publisher 520, upon determining parameter values, not in the feasible region, may adjust downstream models to be applied to the match results. Publisher 520 adjusts downstream models by adjusting the weights of the models.

In step 770, optimization system 100 may store determined one or more weights of ML models associated with a set of search queries of a service. Publisher 520 may store determined weights of ML models in data store 120. In some embodiments, publisher 520 may publish the ML model in ML models repository 140 by marking it as approved and setting a weight value for a type of service. Optimization system 100, upon completion of step 770, completes (step 799) executing method 700 on distributed computing system 400.

Figure 8:
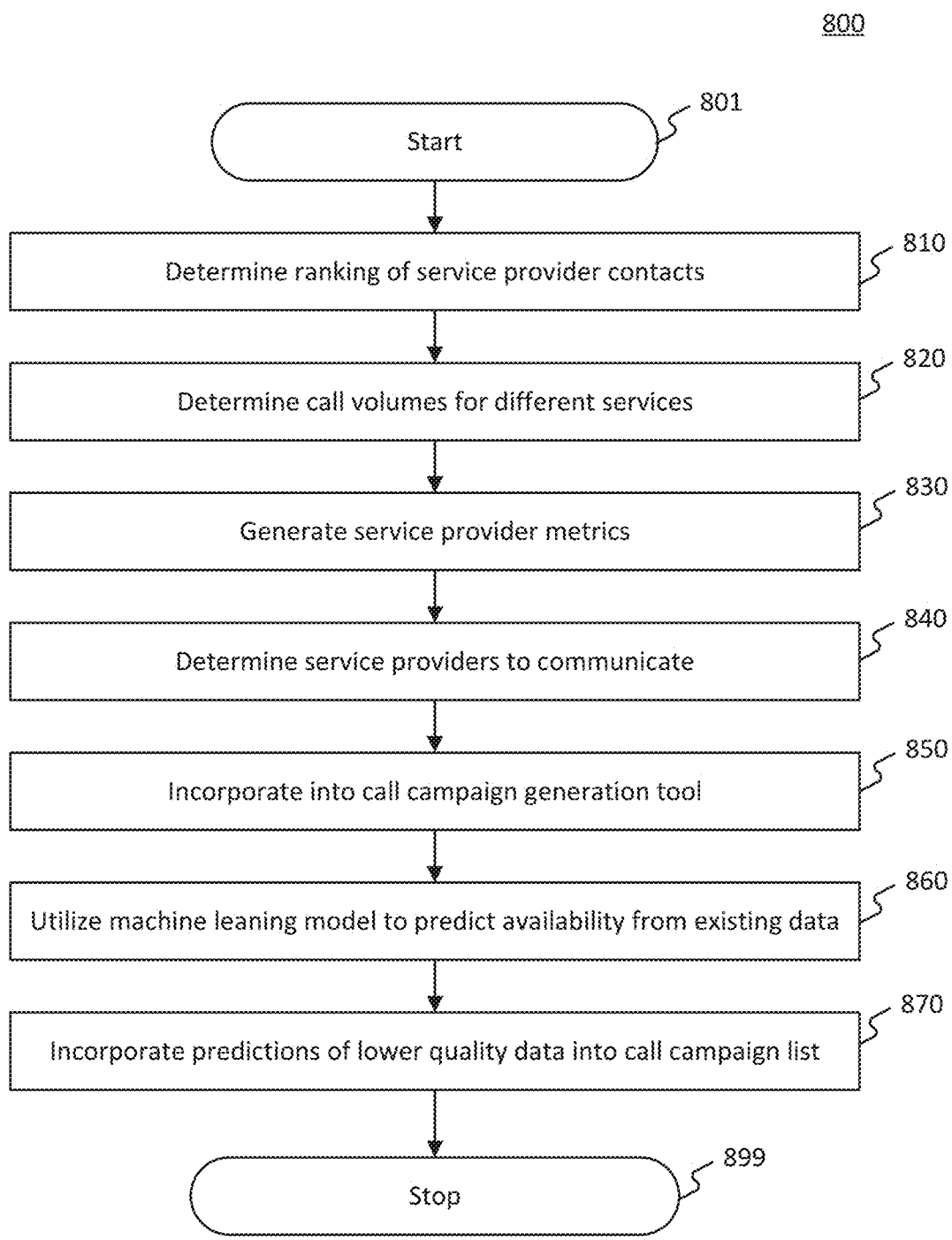
FIG. 8 is a flowchart showing an exemplary method for generating optimized ranks of service providers, according to some embodiments of the present disclosure.

FIG. 8 is a flowchart showing an exemplary method for generating optimized ranking of service providers, according to some embodiments of the present disclosure. The steps of method 800 can be performed by, for example, optimization system 100 of FIG. 1 executing on or otherwise using the features of distributed computing system 400 of FIG. 4 for purposes of illustration. It is appreciated that the illustrated method 800 can be altered to modify the order of steps and to include additional steps.

In step 810, optimization system 100 may determine the ranks of service provider contacts to identify the high value service providers whose data may be reviewed for accuracy. Rank module 610 (as shown in FIG. 6) may rank service providers based on top locations of searches and top searches for service type or service provider types. Rank module 610 may identify the service providers that are present in top locations or have top service provider type specialization or can provide top service type services. A detailed description of the prioritized order of high value service providers is described in detail in FIG. 6 description above.

In step 820, optimization system 100 may determine call volumes for different services to allocate for a call campaign. Optimization system 100 may select a limited number of service providers for each type of service from the ordered list of services. Sorter 611 (as shown in FIG. 6) may help determine the call volume allocation for each service representing a service type offered by a service provider or search request type indicating the types of services requested by users of match engine 130. Determination of call volumes helps determine the number of service providers to consider for addressing each type of service request from a user of match engine 130.

In step 830, optimization system 100 may generate service provider metrics to determine the importance of service providers. Metric calculator 621 (as shown in FIG. 6) may be used to determine a service provider's metrics. A detailed description of metric calculation to determine the importance of service providers is described in FIG. 6 above.

In step 840, optimization system 100 may determine service providers to communicate among the list of ordered high value service providers to improve their service provider data accuracy. Relevance module 620 (as shown in FIG. 6) may be used in identifying the service providers to communicate as part of a call campaign to improve the data accuracy of service providers. Optimization system 100 may identify the subset of high service providers to communicate to optimize the match results of highly likely service providers based on each service provider's metrics. The high likelihood nature of the service providers is based on the identification of top location searches and top service type searches where such service providers.

In step 850, optimization system 100 may incorporate into call campaign queue 640 (as shown in FIG. 6) to conduct a call campaign to generate accurate service provider data. Incorporation module 630 (as shown in FIG. 6) may be used to incorporate identified service providers to communicate into call campaign queue 640 and conduct and track the call campaign. The call campaign may be an automated process conducted over telephone or email, or instant messaging with a set of standardized questions. A user of optimization system 100 may configure the call campaign process in terms of communication channel and questions. In some embodiments, multiple configurations may exist for different types of services and service providers. For example, a match engine search system for healthcare providers may have a call campaign with different questions for doctors involved in physiological issues and mental issues. For instance, a psychologist may be asked about their options for online availability, but a surgeon may be asked about their availability for surgeries.

In step 860, optimization system 100 may utilize an ML model to predict availability data by resolving conflicts between supplemental data sources. Data improvement module 650 (as shown in FIG. 6) may be used to determine each data source's quality and resolve conflicts between data accordingly. Data improvement module 650 may determine data source quality by determining the staleness of the data source. A detailed description of data source quality and conflict resolution is described in FIG. 6 description above. Predictor 651 (as shown in FIG. 6) may utilize a ML model to predict the conflicts between data sources and which data is to be considered accurate.

In step 870, optimization system 100 may incorporate the predictions with lower accuracy back into the call campaign list for further improvement of data. Optimization system 100 upon completion of step 870, completes (step 899) executing method 800 on distributed computing system 400.

Figure 9:
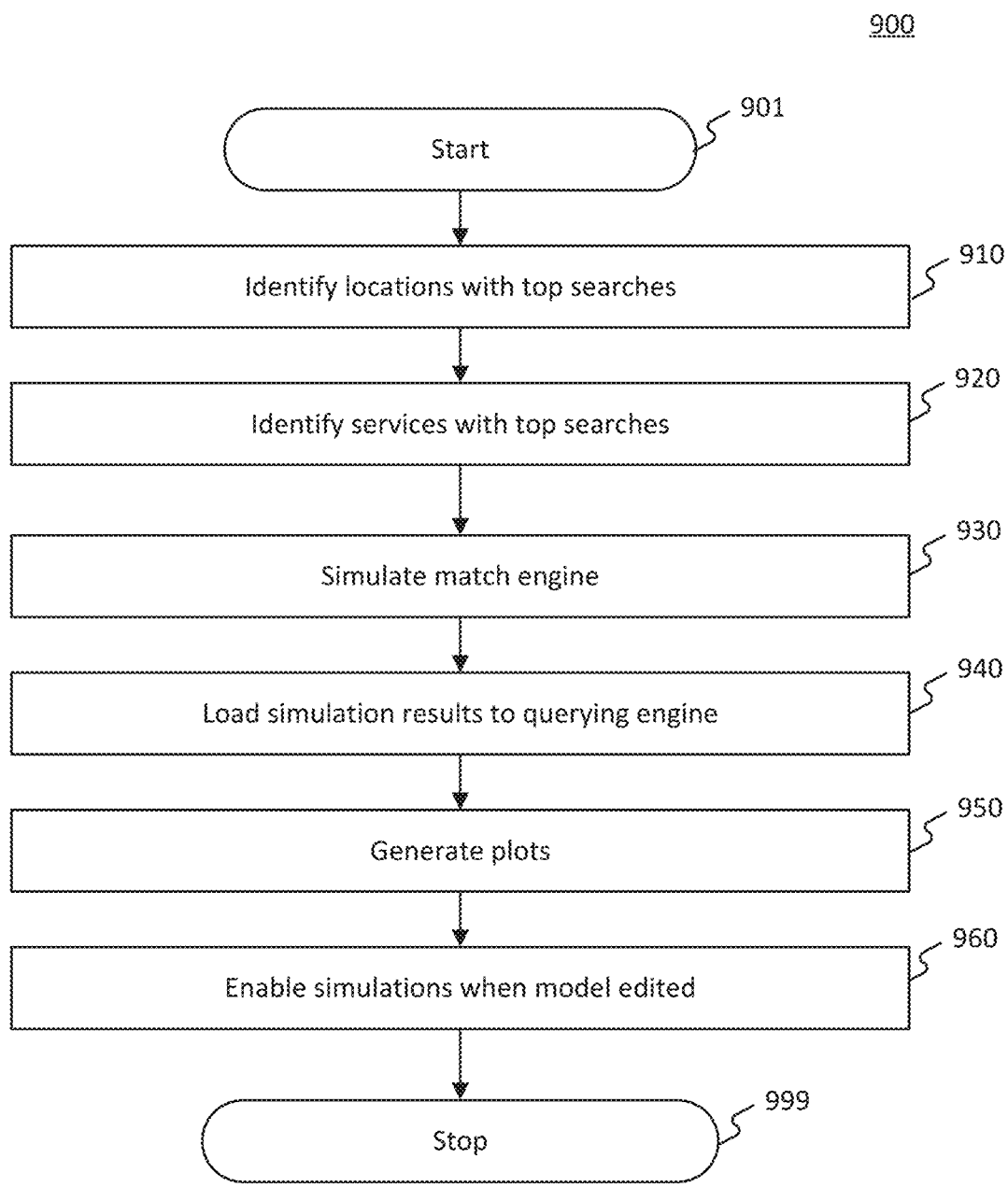
FIG. 9 is a flowchart showing an exemplary method for optimizing return on investment on a search system, according to some embodiments of the present disclosure.

FIG. 9 is a flowchart showing an exemplary method for determining the optimized return on investment for the searches conducted using match engine 130, according to some embodiments of the present disclosure. The steps of method 900 can be performed by, for example, optimization system 100 of FIG. 1 executing on or otherwise using the features of distributed computing system 400 of FIG. 4 for purposes of illustration. It is appreciated that illustrated method 900 can be altered to modify the order of steps and to include additional steps.

In step 910, optimization system 100 may identify locations with top searches by calculating the number of searches conducted using match engine 130 in each location. A location can be a postal code or a group of postal codes and can be configured by a user of optimization system 100. In some embodiments, locations may be configured to have an equal area or equal population or an equal number of service providers. Location details may be configured at runtime by using configuration files (e.g., configuration file 170 of FIG. 1) provided by user 150 requesting to optimize match engine 130. Optimization system 100 may review query data 122 (as shown in FIG. 1) to determine the top searched locations. ROI optimization module 114 (as shown in FIG. 1) of optimization system 100 may seek help from rank module 610 (as shown in FIG. 6) to rank service providers and identify the top search locations.

In step 920, optimization system 100 may identify services with top searches by calculating the number of searches conducted using match engine 130 for certain types of services or service provider specializations. Optimization system 100 may have the ability to configure the service type and service provider specializations. Optimization system 100 may review query data 122 (as shown in FIG. 1) to determine the top searched services. ROI optimization module 114 of optimization system 100 may seek from rank module 610 (as shown in FIG. 6) to rank service providers and identify the top searched services.

In step 930, optimization system 100 may simulate match engine search using match analyzer 111 (as shown in FIG. 1). Match analyzer 111 may take as input top search locations, and top searched services from steps 910 and 920 to generate a set of search queries. In some embodiments, match analyzer 111 may review query data 122 (as shown in FIG. 1) of previous searches conducted on match engine 130 to generate a new set of search queries that meet the top search locations and top searched services.

In step 940, optimization system 100 may load the simulated search queries generated in step 930 on match engine 130. Optimization system 100 may load simulated queries by submitting each query (e.g., query 131 of FIG. 1) to match engine 130 and receive match results of the query (e.g., match results 132 of FIG. 1). In some embodiments, optimization system 100 may load simulation queries shared by user 150 via network 180 using configuration file 170.

In step 950, optimization system 100 may generate plots of service providers and predicted expenditure for the selected service providers. Optimization system 100 may utilize ML models to predict a service provider's potential selection for a particular service and the type of services offered based on the search queries.

In step 960, optimization system 100 may enable simulations of search queries to be loaded and executed when an ML model of ML models repository 140 (as shown in FIG. 1) is updated or a new ML model is included in match engine 130. Optimization system 100, upon completion of step 960, completes (step 999) executing method 900 on distributed computing system 400.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Example embodiments are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct one or more hardware processors of a computer, other programmable data processing apparatus, or other devices to function in a particular manner, such that the instructions stored in the computer readable medium form an article of manufacture including instructions that implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions/acts specified in the flowchart or block diagram block or blocks.

Any combination of one or more computer readable medium(s) may be utilized. The computer readable medium may be a non-transitory computer readable storage medium. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, IR, etc., or any suitable combination of the foregoing.

Computer program code for carrying out operations, for example, embodiments may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate examples of the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment may be combined with, or eliminated from, other embodiments in suitable ways to accomplish desired design objectives.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A non-transitory computer readable medium including instructions that are executable by one or more processors to cause a system to perform a method for updating a machine learning model utilized in a search engine operation, the method comprising:
    identifying a set of search queries in stored search queries, wherein the set of search queries correspond to a request for a service offered by a service provider;
    applying the identified set of search queries to the search engine to generate one or more search results for the service, wherein each search result has an assigned aggregate based on values of a set of parameters associated with the service offered by the service provider, wherein the set of parameters are based on configured objectives of the search engine identified using an optimization module;
    analyzing the values of the set of parameters to determine a tradeoff point of each parameter, wherein the tradeoff point of a parameter occurs when updating the value of the parameter negatively impacts other parameters in the set of parameters;
    determining one or more weights to apply to the machine learning model based on the tradeoff points of the set of parameters;
    storing the determined one or more weights, wherein the stored weights are associated with the service corresponding to the identified set of stored search queries; and
    applying the determined one or more weights to the machine learning model for a search query corresponding to the service.

2. The non-transitory computer readable medium of claim 1, wherein identifying the set of search queries comprises:
    determining locations where amount of the stored search queries originated is greater than a threshold amount;
    identifying search queries originating in the determined locations; and
    filtering identified search queries not associated with the service.

3. The non-transitory computer readable medium of claim 1, wherein identifying the set of search queries further comprises:
    identifying the set of search queries based on top services that are searched on the search engine.

4. The non-transitory computer readable medium of claim 1, wherein identifying the set of stored search queries corresponds to a plurality of services.

5. The non-transitory computer readable medium of claim 4, wherein the set of instructions that are executable by the one or more processors to cause a system to further perform:
    determining sequentially one or more weights to apply to the machine learning model for each service of the plurality of services.

6. The non-transitory computer readable medium of claim 5, wherein the set of instructions that are executable by the one or more processors to cause a system to further perform:
    aggregating weights of the machine learning model for all services.

7. The non-transitory computer readable medium of claim 1, wherein the machine learning model being updated was not part of the search engine when the identified set of search queries were previously applied to the search engine.

8. The non-transitory computer readable medium of claim 1, wherein updating the value of a parameter negatively impacts other parameters by decreasing in value of one or more of the other parameters.

9. The non-transitory computer readable medium of claim 1, wherein the assigned aggregate based on the set of parameters at least include: quality score of the service provider offering the service or convenience score of the service provider offering the service.

10. The non-transitory computer readable medium of claim 9, wherein the negative impact on the quality score of the service provider occurs with a decrease of the quality score of the service provider.

11. The non-transitory computer readable medium of claim 9, wherein the convenience score of the service provider is based on travel distance between the location of the service provider delivering the service and location where the search query originated.

12. The non-transitory computer readable medium of claim 11, wherein the negative impact on the convenience score of the service provider parameter occurs with increase in the travel distance.

13. A method performed by a system for updating a machine learning model utilized in a search engine operation, the method comprising:
    identifying a set of search queries in stored search queries, wherein the set of search queries correspond to a request for a service offered by a service provider;
    applying the identified set of search queries to the search engine to generate one or more search results, wherein each search result has an assigned aggregate based on values of a set of parameters associated with the service offered by the service provider, wherein the set of parameters are based on configured objectives of the search engine identified using an optimization module;
    analyzing the values of the set of parameters to determine tradeoff point of each parameter, wherein the tradeoff point of a parameter occurs when updating the value of the parameter negatively impacts other parameters in the set of parameters;
    determining one or more weights to apply to the machine learning model based on the tradeoff points of the set of parameters;
    storing the determined one or more weights, wherein the stored weights are associated with the service corresponding to the identified set of stored search queries; and
    applying the determined one or more weights to the machine learning model for a search query corresponding to the service.

14. The method of claim 13, wherein identifying the set of search queries comprises:

determining locations where amount of the stored search queries originated is greater than a threshold amount;

identifying search queries originating in the determined locations; and filtering identified search queries not associated with the service.

15. The method of claim 13, wherein identifying a set of search queries further comprises:

identifying the set of search queries based on top services that are searched on the search engine.

16. The method of claim 13, wherein identifying a set of stored search queries corresponds to a plurality of services.

17. The method of claim 13 further comprises:

determining sequentially one or more weights to apply to the machine learning model for each service of the plurality of services; and aggregating weights of the machine learning model for all services.

18. The method of claim 13, wherein the machine learning model being updated was not part of the search engine when the identified set of search queries were previously applied to the search engine.

19. The method of claim 13, wherein updating the value of a parameter negatively impacts other parameters by decrease in value of one or more of the other parameters.

20. A search engine updating system comprising:

one or more memory devices storing processor-executable instructions; and one or more processors configured to execute the instructions to cause the search engine updating system to perform:

identifying a set of search queries in stored search queries, wherein the set of search queries correspond to a request for a service offered by a service provider;

applying the identified set of search queries to the search engine to generate one or more search results for the service, wherein each search result has an assigned aggregate based on values of a set of parameters associated with the service offered by the service provider, wherein the set of parameters are based on configured objectives of the search engine identified using an optimization module;

analyzing the values of the set of parameters to determine tradeoff point of each parameter, wherein the tradeoff point of a parameter occurs when updating the value of the parameter negatively impacts other parameters in the set of parameters;

determining one or more weights to apply to the machine learning model based on the tradeoff points of the set of parameters;

storing the determined one or more weights, wherein the stored weights are associated with the service corresponding to the identified set of stored search queries; and applying the determined one or more weights to the machine learning model for a search query corresponding to the service.

* * * * *